United States Patent
Famechon et al.

(10) Patent No.: US 11,177,963 B2
(45) Date of Patent: Nov. 16, 2021

(54) METHOD FOR AUTHENTICATING A USER BASED ON AN IMAGE RELATION RULE AND CORRESPONDING FIRST USER DEVICE, SERVER AND SYSTEM

(71) Applicant: GEMALTO, INC., Austin, TX (US)

(72) Inventors: Benoît Famechon, Cedar Park, TX (US); Najam Siddiqui, Pflugerville, TX (US); Karen HongQian Lu, Austin, TX (US); Asad Mahboob Ali, Austin, TX (US)

(73) Assignee: THALES DIS FRANCE SA, Meudon (FR)

( * ) Notice: Subject to any disclaimer, the term of this patent is extended or adjusted under 35 U.S.C. 154(b) by 251 days.

(21) Appl. No.: 15/839,142

(22) Filed: Dec. 12, 2017

(65) Prior Publication Data
US 2019/0182050 A1 Jun. 13, 2019

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/36* (2013.01); *G06F 21/42* (2013.01); *G06K 9/6201* (2013.01);
(Continued)

(58) Field of Classification Search
CPC ..... H04L 9/3247; H04L 63/0838; H04L 9/14; H04L 9/30; H04L 63/06; H04L 63/0853;
(Continued)

(56) References Cited

U.S. PATENT DOCUMENTS

| 8,165,303 | B1 * | 4/2012 | Steele | H04L 9/0869 380/277 |
| 8,594,632 | B1 * | 11/2013 | Azizi | H04W 12/06 455/411 |

(Continued)

OTHER PUBLICATIONS

Notification of Transmittal of the International Search Report and the Written Opinion of the International Searching Authority (Forms PCT/ISA/220, PCT/ISA/210, and PCT/ISA/237) dated Feb. 25, 2019, in corresponding International Application No. PCT/EP2018/083997. (11 pages).

*Primary Examiner* — Kevin Bechtel
*Assistant Examiner* — Hany S. Gadalla
(74) *Attorney, Agent, or Firm* — Buchanan Ingersoll & Rooney PC

(57) ABSTRACT

A server accesses a user identifier associated with a first user device and a reference image as a first image set, to be displayed. The server sends to a second user device an image, as a second image set, to be displayed, and a user request to select an image within the first image set. The second user device displays the second image set and the user request. The user of the first user device selects at least one displayed first image, the selected first image matching an image visually selected within the displayed second image set, according to a rule known to the user and the server. The first user device sends to the server the first user device identifier accompanied with data relating to the selected first image. If the data relating to the selected first image matches the data relating to the first reference image the server authenticates the user.

9 Claims, 2 Drawing Sheets

(51) Int. Cl.
  *G06K 9/62* (2006.01)
  *H04L 9/14* (2006.01)
  *H04L 9/30* (2006.01)
  *G06F 21/42* (2013.01)
  *G06F 21/36* (2013.01)
  *H04W 12/06* (2021.01)
  *G06F 21/78* (2013.01)

(52) U.S. Cl.
  CPC .............. *H04L 9/14* (2013.01); *H04L 9/30* (2013.01); *H04L 9/3215* (2013.01); *H04L 9/3271* (2013.01); *H04L 63/06* (2013.01); *H04L 63/0838* (2013.01); *H04L 63/0853* (2013.01); *H04L 63/18* (2013.01); *H04W 12/06* (2013.01); *G06F 21/78* (2013.01); *H04L 63/0428* (2013.01); *H04L 63/1475* (2013.01); *H04L 2209/80* (2013.01)

(58) Field of Classification Search
  CPC ... H04L 63/18; H04L 9/0863; H04L 63/0428; H04L 63/1475; H04L 9/3215; H04L 9/3271; H04L 2209/80; G06K 9/6201; G06F 21/78; G06F 21/36; G06F 21/42; H04W 12/06
  See application file for complete search history.

(56) References Cited

U.S. PATENT DOCUMENTS

| | | | | |
|---|---|---|---|---|
| 8,667,560 | B2 * | 3/2014 | Albisu | G06F 21/43 705/14.4 |
| 9,537,847 | B2 | 1/2017 | Aissi et al. | |
| 10,158,646 | B1 * | 12/2018 | Desai | H04L 63/102 |
| 2009/0327138 | A1 * | 12/2009 | Mardani | G06Q 20/10 705/64 |
| 2010/0043062 | A1 * | 2/2010 | Alexander | G06F 21/36 726/6 |
| 2010/0120396 | A1 * | 5/2010 | Faith | G06Q 20/40 455/410 |
| 2011/0072493 | A1 * | 3/2011 | Morishita | G06F 21/31 726/3 |
| 2011/0145899 | A1 * | 6/2011 | Cao | H04L 9/3213 726/7 |
| 2011/0231656 | A1 * | 9/2011 | Di Crescenzo | G06F 21/44 713/155 |
| 2013/0023241 | A1 * | 1/2013 | Lim | H04W 12/06 455/411 |
| 2013/0039484 | A1 * | 2/2013 | Sun | G06T 1/005 380/28 |
| 2013/0068837 | A1 * | 3/2013 | Dollard | G06F 21/36 235/380 |
| 2014/0108810 | A1 * | 4/2014 | Chenna | H04L 9/321 713/179 |
| 2014/0372754 | A1 * | 12/2014 | Aissi | H04L 63/08 713/168 |
| 2015/0052349 | A1 * | 2/2015 | Gero | H04L 9/0891 713/153 |
| 2015/0089613 | A1 * | 3/2015 | Tippett | H04L 63/0853 726/7 |
| 2015/0302571 | A1 * | 10/2015 | Lambert | H04L 63/08 382/115 |
| 2016/0352722 | A1 * | 12/2016 | Johri | G06F 21/36 |
| 2017/0257363 | A1 * | 9/2017 | Franke | H04L 63/0853 |
| 2017/0302642 | A1 * | 10/2017 | Hindocha | G06F 21/36 |
| 2017/0331817 | A1 * | 11/2017 | Votaw | H04L 63/0838 |
| 2017/0346851 | A1 * | 11/2017 | Drake | H04L 63/0428 |
| 2018/0123795 | A1 * | 5/2018 | Norman | H04L 63/029 |
| 2018/0139192 | A1 * | 5/2018 | Pishinov | H04L 63/0815 |

* cited by examiner

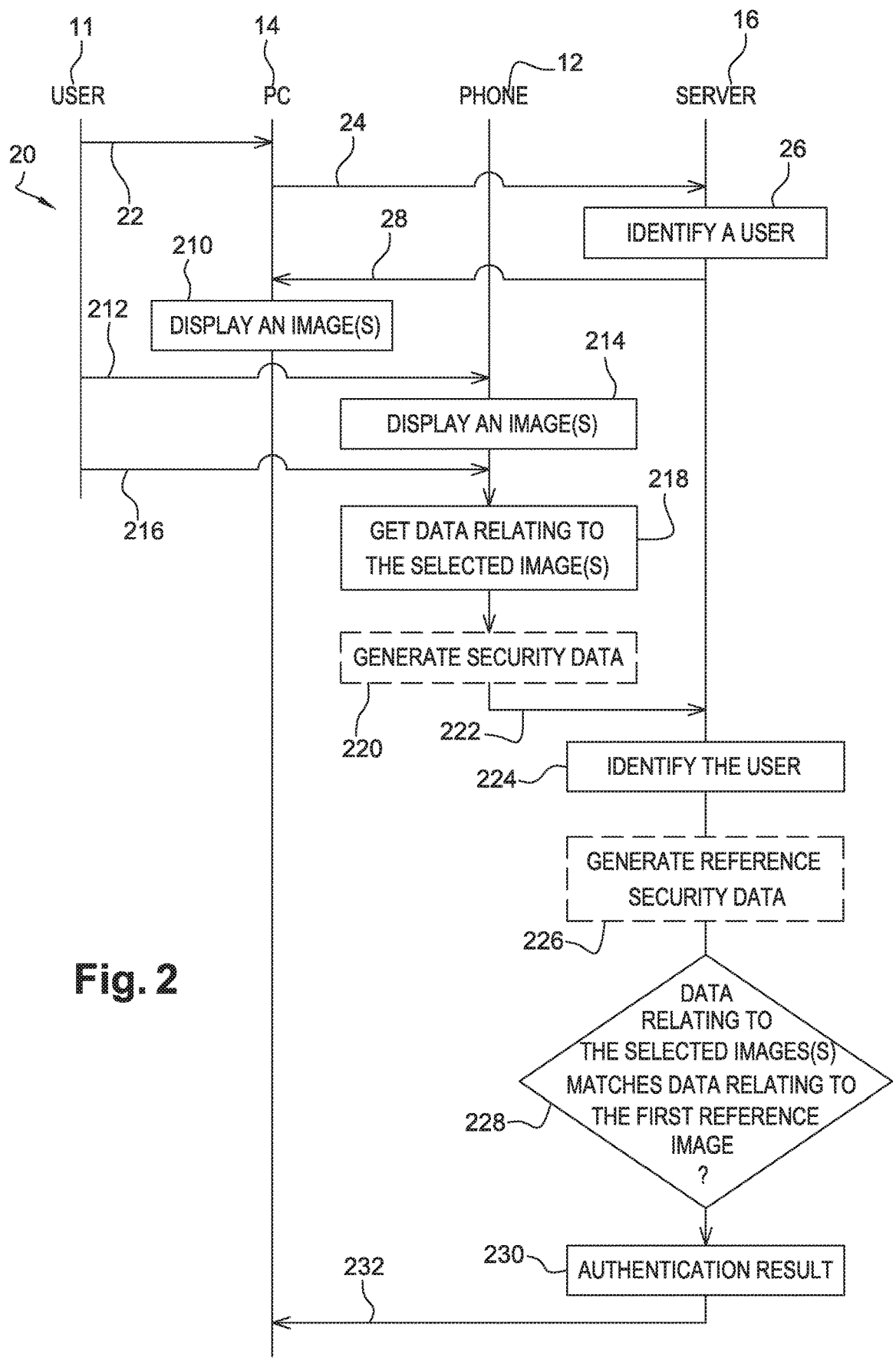

METHOD FOR AUTHENTICATING A USER
BASED ON AN IMAGE RELATION RULE
AND CORRESPONDING FIRST USER
DEVICE, SERVER AND SYSTEM

FIELD OF THE INVENTION

The present invention relates generally to a method, a first user device and a server for authenticating a user based on an image relation rule.

Moreover, the invention pertains to a system for authenticating a user based on an image relation rule as well. The system includes a server and at least two user devices.

The present invention is notably applicable to a field in which a first user device is e.g. a mobile phone and a second user device is e.g. a Personal Computer (or PC).

STATE OF THE ART

It is known that a user uses a PC (web) browser to submit, through a login page, to a server, a One Time Password (or OTP) that has been previously sent, through a Short Message Service (or SMS) message, to a registered user mobile phone. The server that accesses the OTP that is previously generated at the server side verifies on-line the received OTP. When the received OTP matches the generated OTP, the server authenticates the concerned user.

However, a malicious application, known as a Man-In-the-Browser (or MIB), installed on the PC of such a known solution, intercepts the OTP and uses the intercepted OTP to authenticate to the server at the expense of the genuine user.

There is a need of an alternative solution for authenticating a user while being more secure than such an aforementioned known solution.

SUMMARY OF THE INVENTION

The invention proposes a solution for satisfying the just herein above specified need by providing a method for authenticating a user.

According to the invention, a server accesses at least one user identifier associated with at least one identifier relating to a first user device and data relating to at least one image to be received, from or through the first user device, as at least one first reference image. The first user device accesses the at least one identifier relating to the first user device and data relating to at least one image, as a first image set, to be displayed, by or through the first user device. The method comprises:

connecting, from a second user device, to the server;
sending, from the server to the second user device, at least one image, as a second image set, to be displayed by or through the second user device, and a user request to select, through the first user device, by the user, at least one image comprised within the first image set to be displayed by or through the first user device;
displaying, by or through the second user device, the second image set and the user request;
displaying, by or through the first user device, the first image set;
selecting, by the user of the first user device, within the displayed first image set, at least one displayed first image, as at least one selected first image, the at least one selected first image matching with at least one image visually selected within the displayed second image set, according to an image relation rule known to the user and the server;
sending, from the first user device to the server, as a user request response, the at least one first user device identifier accompanied with data relating to the at least one selected first image;
verifying, by the server, for the identified user, whether the data relating to the at least one selected first image does or does not match the data relating to the at least one first reference image according to the image relation rule; and
succeeding, by the server, in authenticating the user if the data relating to the at least one selected first image matches the data relating to the at least one first reference image according to the image relation rule.

The principle of the invention consists in registering at a server an (identified) user, an (identified) first user device with data relating to a first reference image(s) to be provided via the first user device and in initiating from a second user device a connection to the server. The server sends back to the second user device one or several images, as a second image set, to be displayed via the second user device and a user request to extract (or submit), via the first user device, an image to be chosen by the user, among one or several images, as a first image set, to be displayed via the first user device. The second user device displays (or lets another device display) the received second image set and user request. The first user device accesses, besides the first user device identifier, the (locally) registered first image set to be displayed at the first user device side and that includes an image(s) to be selected by the user. The first user device displays (or lets display) the (registered) first image set among which there is(are) a first reference image(s) that is(are) registered at the server side. The user of the first user device selects a displayed first image(s), namely an image(s) visually selected within the displayed second image set or an image(s) associated with an image(s) visually selected within the displayed second image set according to a rule relating to an image correspondence or an image relation rule that the user and the server both know. Once the user has selected the image(s) displayed via the first user device, the first user device transmits to the server the first user device identifier along with data relating to the selected first image(s), as a user request response. The server then checks, for the (identified) user, whether the (received) data relating to the selected first image(s) matches (or not) the (registered) data relating to the first reference image(s) according to the image relation rule. If the data relating to the selected first image(s) matches the data relating to the first reference image(s) according to the image relation rule, then the server authenticates the user. Otherwise, the server does not authenticate the user.

Each of the first and second user devices may be a standalone entity or may cooperate with another entity(ies), such as an embedded or removable chip(s), like e.g., a Secure Element (or SE), to authenticate more securely the concerned user.

Within the present description, an SE is a smart object that includes a chip(s) that protect(s), as a tamper resistant component(s), access to stored data and that is intended to communicate data with a device(s), like e.g., an SE host device, and/or an SE user.

The invention authentication solution is based on an image display on the first and second user devices and an image selection by the user via the first user device according to an image relation rule between the image(s) visually selected among the second image set and the image(s) to be selected and submitted among the first image set. The image relation rule between the image(s) displayed via the second user device and the image to be selected by the user via the first user device is known to the server and the user. Data relating to the user selected first image(s) is then sent within a user request response and compared, at the server side, to data relating to the registered first reference image(s) according to the image relation rule. Only when the data relating to the (received) selected first image(s) and the data relating to the registered first reference image(s) match according to the image relation rule, the server authenticates the user.

Only the user who has the first user device, as a Factor Authentication (or FA)—something that the user has, and who shares with the server the image relation rule between the image(s) visually selected by the user via the second user device and the image to be selected by the user via the first user device, as another FA—something that the user knows, is able to authenticate to the server.

For the user, the invention authentication solution is simple, easy and quick to use due to its visual aspect. As a matter of fact, the user has just to know the image relation rule and select an image(s), according to the image relation rule that she or he knows (e.g. displayed by or through the second user device). The user does not need neither to enter any data, like e.g., an OTP, a number or a text on the first or the second user device nor to manipulate the first or second user device, so as to capture data originating from the server through the second or first user device.

Additionally, the invention authentication solution avoids to be spammed at the first user device since the first user device sends the user request response without needing to receive from the server any message/data during the user authentication process. This is particularly interesting when the first user device is a mobile (computer) device.

The first reference image(s) may be either identical to or associated with an image(s), as a second reference image(s), visually selected among all of the image(s) displayed via the second user device.

It is to be noted that the invention imposes no constraint as to the nature of the first reference image(s) to be selected by the user via the first user device.

The invention authentication solution includes a server reception, over a first channel, of connection data from the second user device, a server transmission, over the first channel, of user authentication data relating to an image(s) to be displayed via the second user device, as a challenge, and a server reception, over a second channel, of submitted user authentication data relating to a user selected image(s), as a challenge response, from the first user device and a server authentication based on an image relation rule known to the server and the user.

The user (authentication data) request (or challenge) is conveyed over the first channel linking the second user device and the server while the submitted user (authentication data) response (or challenge response) is conveyed over the second channel linking the first user device and the server. The first and second channels are separate from each other.

Such a use of two separate channels to communicate the required user request (challenge) and user request response data (or challenge response) to authenticate the concerned user allows enhancing the security of the thus exchanged data. As a matter of fact, a potential attacker has to capture data conveyed over the two separate channels to authenticate fraudulently to the server, as the concerned user.

It is to be noted that the invention does not impose any constraint as to the two used separate channels. The first channel may be related to an HyperText Transfer Protocol (or HTTP) (registered trademark) type channel or any other data communication channel. The second channel may be related to an Over-The-Air (or OTA) or Over-The-Internet (or OTI) type channel or any other data communication channel.

The invention authentication solution based on an image relation rule known to the user and the server is thus secure. As a matter of fact, the user interacts with a second user device to launch a user authentication process with the server and receive back one or several images to be used as a challenge, and the user sends, via the registered first user device, submitted user authentication data relating to an image(s) selected, according to the image relation rule, by the user, as a challenge response.

The invention authentication solution allows enhancing, with respect to the aforementioned prior art solution, the security against, in particular, a MIB type attack.

The invention authentication solution allows authenticating securely the user of the second user device and the first user device to be used for sending required user authentication data to be recognized by the server.

Preferably, the first user device further accesses and uses security data, like e.g., one or several cryptographic keys, relating to the selected first image(s) and the server further accesses and uses security data, like e.g., one or several cryptographic keys, relating to the first reference image(s). The server thus succeeds in authenticating the user while communicating securely the user request response from the first user device to the server.

Thus, the first user device and the server carry out a strong user authentication.

According to an additional aspect, the invention is a first user device for authenticating a user. According to the invention, the first user device comprises means for accessing at least one identifier relating to the first user device and data relating to at least one image, as a first image set, to be displayed, by or through the first user device. The first user device is configured to:

display, by or through the first user device, the first image set;

let select, by the user of the first user device, at least one displayed first image, as at least one selected first image, the at least one selected first image matching with at least one image visually selected within at least one image, as a second image set, displayed by or through a second user device, according to an image relation rule known to the user and a server; and send to the server, as a user request response, the at least one first user device identifier accompanied with data relating to the at least one selected first image.

The first user device may be a user terminal, like e.g., a mobile phone or an SE, or any kind of communicating computing device.

According to still an additional aspect, the invention is a server for authenticating a user.

According to the invention, the server comprises means for accessing at least one user identifier associated with at least one identifier relating to a first user device and data relating to at least one image to be received, from or through the first user device, as at least one first reference image. The server is configured to:

be connected from a second user device;

send to the second user device at least one image, as a second image set, to be displayed by or through the second user device, and a user request to select, through the first user device, by the user, at least one image comprised within at least one image, as a first image set, to be displayed by or through the first user device;

receive, as a user request response, at least one first user device identifier accompanied with data relating to at least one selected first image;

verify, for the identified user, whether the data relating to the at least one selected first image does or does not match the data relating to the at least one first reference image according to an image relation rule known to the user and the server; and succeed in authenticating the user if the data relating to the at least one selected first image matches the data relating to the at least one first reference image according to the image relation rule.

According to still a further aspect, the invention is a system for authenticating a user.

According to the invention, the system includes a server and a first user device and at least a second user device. The server comprises means for accessing at least one user identifier associated with at least one identifier relating to the first user device and data relating to at least one image to be received, from or through the first user device, as at least one first reference image. The first user device comprises means for accessing the at least one identifier relating to the first user device and data relating to at least one image, as a first image set, to be displayed, by or through the first user device. The second user device is configured to connect to the server. The server is configured to send to the second user device at least one image, as a second image set, to be displayed by or through the second user device and a user request to select, through the first user device, by the user, at least one image within the first image set to be displayed by or through the first user device. The second user device is configured to display or let display the second image set and the user request. The first user device is configured to:

display or let display the first image set;

let select, by the user of the first user device, at least one displayed first image, as at least one selected first image, the at least one selected first image matching with at least one image visually selected within the displayed second image set, according to an image relation rule known to the user and the server; and send to the server, as a user request response, the at least one first user device identifier accompanied with data relating to the at least one selected first image.

The server is configured to:

verify, for the identified user, whether the data relating to the at least one selected first image does or does not match the data relating to the at least one first reference image according to the image relation rule; and succeed in authenticating the user if the data relating to the at least one selected first image matches the data relating to the at least one first reference image according to the image relation rule.

The system may include, at the client side, a mobile phone, as a first user device, and a PC, as a second user device.

BRIEF DESCRIPTION OF THE DRAWINGS

Additional features and advantages of the invention will be apparent from a detailed description of one preferred embodiment of the invention, given as an indicative and non-limitative example, in conjunction with the following drawings:

FIG. 2 represents an example of a flow of messages exchanged between the user, the PC, the server and the phone of the system of FIG. 1, so that the server authenticates the user, thanks to a use of the PC and the phone, while using two separate channels and the image relation rule shared between the user and the server.

DETAILED DESCRIPTION

Figure 1:
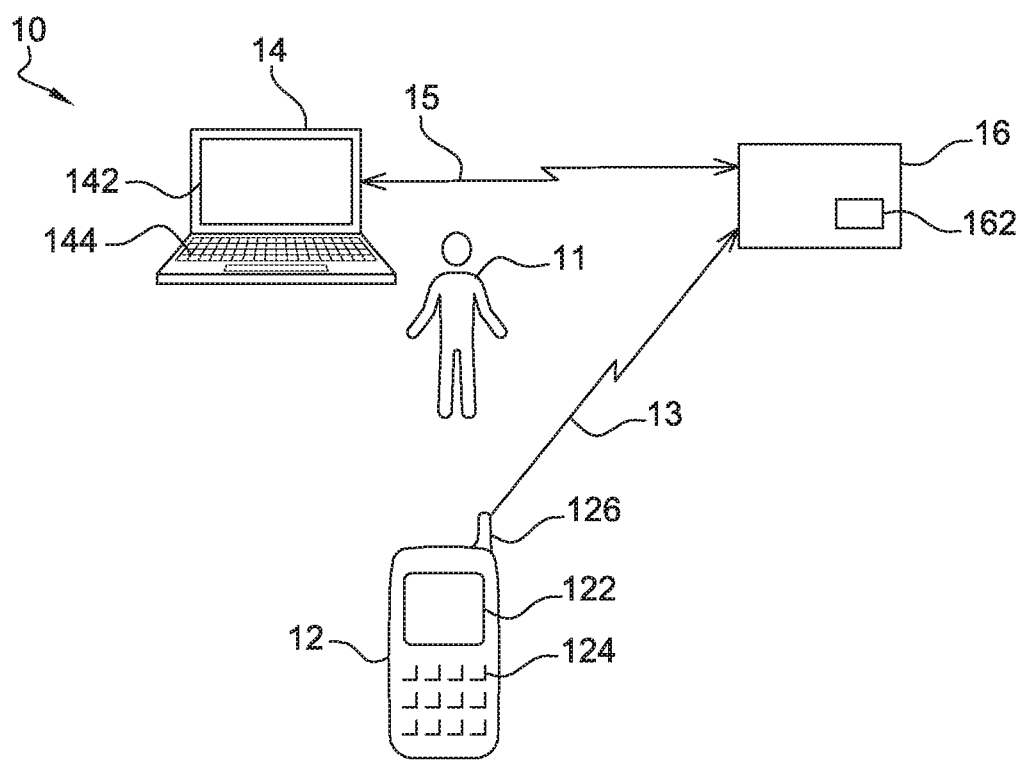
FIG. 1 illustrates a simplified diagram of an exemplary embodiment of a system comprising a PC, a server and a mobile phone previously registered at the server side, the system using the PC to launch an on-line user authentication process and receive back a user "challenge" based on an image(s) to be displayed via the PC, and the phone to send to the server data relating to the user selected image(s) among a set of image(s) displayed via the phone, so that the user submits, based on an image relation rule, the data relating to a phone image(s) selected from the phone displayed image set, to authenticate to the server, according to the invention.

Herein under is considered an exemplary embodiment in which the invention method for authenticating a user is implemented notably by a PC, as a standalone entity, and a mobile phone, as a standalone entity, i.e. without cooperating with another device, such as an SE.

According to another exemplary embodiment (not represented), the invention method for authenticating a user is implemented by two computer devices with one or two user terminals in cooperation with a respective SE. According to such an embodiment, the SE, as the first or the second user device for authenticating a user, is adapted to perform the functions that are carried out by the PC or the phone respectively and described herein while further providing a secure data storage and/or processing.

The SE may be an incorporated chip, as a chip soldered, possibly in a removable manner, like e.g., an embedded SE, an embedded Universal Integrated Circuit Card (or eUICC) or an integrated Universal Integrated Circuit Card (or iUICC), on a Printed Circuit Board (or PCB) of an SE host device, or a chip that is coupled to the user terminal, as an SE host device, and included within a Universal Serial Bus (or USB), a smart card or any other medium (that may have different form factors). The chip may therefore be fixed to or removable from its host device, like e.g., the PC or the mobile phone.

The invention does not impose any constraint as to a kind of the SE type.

Naturally, the herein below described embodiment is only for exemplifying purposes and is not considered to reduce the scope of the present invention.

FIG. 1 shows schematically a system 10 for authenticating a user 11 with a (mobile) phone 12, a PC 14 and a (web) server 16.

For the sake of simplicity, only one phone 12, as a first user device, and one PC 14, as a second user device, for the user 11 has been represented.

However, the server 16 may manage several first user devices for each registered user 11. The server 16 manages a plurality of user accounts and corresponding associated first user devices.

Instead of being constituted by a phone, the first user device may be constituted by e.g., a smart phone, a PC, a set-top box, a tablet computer, a desktop computer, a laptop computer, a video player, an audio player, a media-player, a game console, a netbook, a Personal Digital Assistant (or PDA) or any other computer device connected to or including a Man Machine Interface (or MMI).

The user 11 desires to benefit from one or several services supplied by or through the server 16. The services provided by or through the server 16 may satisfy Word Wide Web Consortium (or W3C) type rules.

The user 11 is registered, as one user account, to the server 16 by using e.g., a user name, as a user 11 IDentifier(s) (or ID(s)), so as to access one or several services provided by or through the server 16.

During the registration to the server 16, the user 11 may identify and select one or several first user devices including the phone 12 that are associated with the (identified) user 11 and to be involved for being authenticated by (or through) the server 16.

The phone 12 is thus identified and registered to the server 16 in association with the user 11 ID(s), by using e.g., a Mobile Station International Subscriber Directory Number (or MSISDN), as the phone 12 number, and/or the like, as a phone 12 ID(s), that allow(s) uniquely identifying the phone 12.

The phone 12 includes one or several (micro)processor(s) and/or (micro)controller(s) (not represented), as data processing means, one or several memories (not represented), as data storing means, and one or several Input/Output (or I/O) interfaces (not represented).

The phone processor processes data originating from and/or intended to any internal component and data originating from and/or intended to any external device through one or several phone I/O interfaces.

The phone memories may include one or several EEPROMs (acronym for "Electrically Erasable Programmable Read-Only Memory"), one or several ROMs (acronym for "Read Only Memory"), one or several Flash memories and/or any other memories of different types, like e.g., one or several RAMs (acronym for "Random Access Memory").

The phone I/O interface(s) comprise(s) (and/or is connected to) a display screen 122 and a keyboard 124, as a phone MMI, so as to interact with the phone user 11.

Once registered at the server 16 side, the phone 12 (down)loads preferably a vanilla application, i.e. an application that is not personalized specifically for its concerned user, as a (client) invention (authentication) application. The invention application includes or accesses a first set of one or several images, as a generic first image set, to be presented via the phone 12.

Additionally, the invention application preferably includes a secret key Ks, as a shared secret, which is shared with all of the first user devices for all of the users registered or to be registered at the server 16 side.

The phone processor executes notably, besides an Operating System (or OS), the invention application, when launched preferably by the user 11.

The generic first image set is preferably used by all of the first user devices for all of the users registered or to be registered at the server 16 side.

The generic first image set includes a predefined number of images, like e.g., ten.

To initialize the invention application, the user 11 enters a unique user ID, like e.g., a phone ID. Alternately, the invention application retrieves automatically a phone ID(s) from a phone memory or a memory of a device (not represented), like e.g., an SE, connected or coupled to the phone 12.

To personalize the invention application, the server 16 may present, through the PC MMI, a sequence of a subset, like e.g., four, of the generic first image set, as a generic first image subset. The generic first image subset sequence may be randomly generated, by the server 16, from the generic first image set. The user 11 is requested, through the PC MMI, to launch the invention application and select or extract, in the same sequence than the one presented through the PC 14, a generic first image subset. The user 11 then launches an execution of the invention application and select the generic first image subset in the same sequence than the one presented through the PC 14. Based on the user 11 first image subset selection, the invention application generates (or determines) preferably two session keys, namely a Ke for encrypting data to be sent and a Km for signing data to be sent and ensuring an integrity of the data to be sent, so as to establish a secure communication with the server 16.

The generation of the Ke and the Km may be based on a key derivation function with three inputs, like e.g., a user ID, the specific first image subset, as selected by the user 11 and the Ks, as the secret shared with the server 16.

All of the three inputs are also known to the server 16 which also generates separately the same two session keys Ke and Km for the concerned user 11 with the same inputs. The two session keys Ke and Km are used separately at the phone 12 and the server 16 sides to securely communicate between the phone 12 and the server 16.

The invention application preferably sends to the server 16 a message for binding the invention application to the concerned user 11 account. Such a binding message includes the user ID, in plain text (i.e. not encrypted), and the phone ID with the user ID that are both encrypted by using the Ke and the Km. The user ID is e.g., at the beginning of the binding message, so that the server 16 can use the user ID to also generate the two session keys Ke and Km. The binding message is preferably sent, through a secure channel, like e.g., a Transport Layer Security (or TLS) type protocol, to the server 16. The server 16 reads the user ID and generates the two session keys Ke and Km, based on the user ID, the generic first image subset and the Ks, as the secret shared with the phone 12. The server 16 decrypts the encrypted payload, namely the phone ID with the user ID. The server 16 then registers, in an associated manner, the user ID, the phone ID and the two session keys Ke and Km. Once the user 11 is registered, the server 16 sends back preferably, while using the two session keys, a confirmation of the user registration possibly with the two session keys Ke and Km to be used for securely communicating between the phone 12 and the server 16. Once the server 16 and the phone 12 both store the same two session keys Ke and Km, the server 16 may transmit securely to the phone 12 a specific first image set that may have been either generated on the fly or retrieved from a database stored in a memory accessible from the server 16. The server 16 and the phone 16 then both store the same specific first image set in association with the concerned user ID. The specific first image set may be used instead of the generic first image set. The server 16 may indicate, through the phone 12, to the user 11 that the phone binding has been successfully completed.

The phone 12 installs and supports the invention application that may have been personalized for the concerned user 11.

The invention application (when executed by a phone 12 processor) allows the user 11 to select an image(s) in the (specific or generic) first image set that is to be presented to the user 11 via the phone 12 according to a rule of a relation with a corresponding image(s) to be visually selected among a second set of one or several images, as a second image set, that are to be presented to the user 11 via the PC 14 and to send to the server 16 data relating to the user selected image(s).

The phone 12 is able to trigger, under user 11 control, an execution of the invention application.

The phone 12 is adapted to present or let present to the user 11, as a generic or specific first image set, the first set of one or several images that are stored in a phone memory (not represented) or a memory of a device (not represented), such as an SE, that is connected or coupled to the phone 12.

A phone 12 memory (and/or a memory of another device connected to the phone 12) stores one or several phone IDs, such as the MSISDN, an International Mobile Equipment Identity (or IMEI), an email address and/or other data for identifying uniquely the phone 12, as a first user device.

A phone 12 memory (and/or a memory of another device connected to the phone 12) stores data relating to one or several images comprised within the first image set to be presented to the user 11.

Each image may be of any type, such as a drawing(s), a picture(s), a photo(s), an icon(s), a text(s), a number(s) and/or some graphical information.

Each image may be associated with a set of data that includes information, like e.g., a challenge, a transaction identifier and/or a validity date.

The data set may be for one time use only or re-usable for a predetermined number of times depending on a security rule. The data set may be deleted or removed from the memories at the first user device side, such as the phone 12, and at the server 16 side that store the data set.

The data set may be embedded within the presented or displayed graphical information. The invention application is able to retrieve the data set by extracting one or several data items to be found from the concerned image.

The data set may be referenced from one or several external sources, like e.g., one or several images to be presented or displayed and selected by the user 11 among the first image set.

The invention application is able to retrieve the data set by getting the external source(s) and the corresponding associated data item(s).

The retrieved data set may be used at least partly, as an input(s), for one or several cryptographic operations, such as a generation of a session key, such as an encryption key Ke or a signature key Km.

The phone 12 MMI (or an MMI of another device connected to the phone 12) is preferably used to display the first image set that is locally registered and that is either generic or specific (when the invention application is personalized).

The phone 12 MMI (or an MMI of another device connected to the phone 12) may be used for presenting information to the phone user 11, like e.g., a message for prompting or requesting the user 11 to select or extract one or several images that are presented or to be presented to the user 11 by or through the phone 12, as a challenge.

The phone 12 is arranged to get, among the presented first image set, one or several images that are selected by the user 11.

The invention application plays a client role that allows to (up)load information to the server 16, as a user authentication server.

The phone I/O interface(s) includes one or several I/O interfaces, like e.g., an antenna 126, allowing to transmit data, via possibly a communication network(s) (not represented), through a first (communication) channel 13 utilizing a wire and/or wireless link, as a first link, with the server 16.

The antenna 126 allows communicating, through a Radio-Frequency (or RF) link(s) 13, as a wireless link(s), via a second (communication) network(s), data to the server 16.

The RF may be fixed at several hundreds of MHz, e.g., around 850, 900, 1800, 1900 and/or 2100 MHz, as Long Range (or LR) type RF.

The first link between the phone 12 and the server 16 is at least mono-directional, namely at least an uplink, i.e. from the phone 12 to the server 16.

The first channel 13 may be secure or unsecure.

According to an essential invention feature, the phone 12 is adapted to send, through the first channel 13, to the server 16, a retrieved (or user entered) phone ID(s) and the retrieved data relating to the image(s) selected by the user 11, as a challenge response or a user request response.

The retrieved data relating to the selected image(s) may include a hash (an identifier(s) or the like) relating to the concerned selected image(s), so as to reduce the number of the data to be sent.

Prior to such a data sending to the server 16, the phone 12 may generate security data relating to the selected image(s), such as a session key(s), like e.g., one or several cryptographic keys, by using a corresponding generation algorithm(s) that is(are) shared with the server 16. The phone 12 stores (or lets store) the possibly generated (or (downloaded from or through the server 16) security data relating to the selected image(s). The phone 12 may use an encryption key Ke, as a session key, to encrypt the user request response prior to its sending to the server 16. The phone 12 may use a signature key Km, as a session key, to sign, prior to a data sending to the server 16, the (possibly previously encrypted) user request response. The phone 12 uses the security data relating to the selected image(s), such as the Ke and/or the Km, so as to transfer securely the user request response to the server 16.

The phone 12 MMI is used for continuing a user authentication process that has been previously launched via the PC 14 to login (or connect) to the server 16.

The user 11 uses the PC 14 to launch a login (or connection) to the server 16.

The PC 14 includes one or several (micro)processor(s) and/or (micro)controller(s) (not represented), as data processing means, one or several memories (not represented), as data storing means, and one or several I/O interfaces (not represented).

The PC processor processes data originating from and/or intended to any internal component and data originating from and/or intended to any external device through one or several PC I/O interfaces.

The PC 14 supports a (web type) browser application.

The PC processor executes notably, besides an Operating System (or OS), the browser application.

The browser application may be, as known per se, a Microsoft Internet Explorer (registered trademark), a Mozilla Firefox (registered trademark) application or any other browser application.

According to an alternative, instead of the browser application, the client is a proprietary application, such as a desktop application, i.e. an application that is typically only accessible by an issuer (or provider) of the considered application, that allows to exchange data with the server 16.

The browser application plays a client role that allows to (up)load information to the server 16 to trigger a login or connection to the server 16.

The browser application is also preferably used to (down)load information, as a challenge or a user request, from the server 16.

The PC I/O interface(s) comprise(s) (and/or is connected to) a display screen 142 and a keyboard 144, as an MMI, so as to interact with the PC user 11.

The PC MMI may be used for launching a user authentication process through the client to the server 16.

The PC I/O interface(s) includes one or several I/O interfaces for exchanging data, via a second communication network (not represented), through a second (communication) channel 15 utilizing a wire or wireless link, with the server 16.

The PC 14 is adapted to send to the server 16, through the second channel 15, a user ID and a request to get one or several images, as a challenge that allows the user to authenticate.

The second link between the PC 14 and the server 16 is bidirectional.

The second channel 15 may be secure or unsecure.

The PC I/O interface with the server 14 may use a HTTP, a File Transfer Protocol (or FTP) and/or any other data communication protocol(s), so as to communicate with the server 16.

The PC 14 is able to trigger, preferably under user 11 control, an execution of the browser application (or the like), and access, through the browser, the server 16, to authenticate the user 11.

The PC 14 is able to send, from the user 11, through the PC MMI or an MMI connected or coupled to the PC 14 and the browser (or the like), via the second channel 15, to the server 16 a user ID, like e.g., a user name and/or a mobile phone number.

According to an essential invention feature, the PC 14 is arranged to receive, from the server 16, as a second image set, a set of one or several images to be presented by or through the PC 14.

The PC 14 MMI (or an MMI of another device connected or coupled to the PC 14) is preferably used for displaying the second image set received from the server 16.

The PC 14 may be arranged to receive, from the server 16, besides the second image set, a user request to select, through the phone 12, one or several images within the first image set to be displayed by or through the phone 12.

The user request to select, through the phone 12, one or several images within the first image set to be displayed by or through the phone 12 may be implicit, i.e. not presented by or through the PC 14, or explicit, i.e. presented by or through the PC 14.

The PC 14 MMI (or an MMI of another device connected or coupled to the PC 14) may be used for displaying information to the PC user 11, like e.g., a message for prompting or requesting the user 11 to select or extract one or several images that are presented or to be presented to the user 11 by or through the phone 12, as a challenge.

The server 16 is connected to the PC 14 over the second channel 15.

The server 16 is remote and accessible through one, two or more communication networks, such as an Intranet network and/or an Internet network, that allow to define or form the second channel 15.

The server 16 is also accessible through a mobile radio-communication network(s) or the like allowing to define or form the first channel 13.

The second channel 15 is separate or distinct from the first channel 15.

The second channel 15 may be secure or unsecure.

According to an alternative embodiment (not represented), the server 16 is local. For example, the server 16 is embedded within a device, such as the PC 14 or an SE that is connected or coupled to the PC 14.

The server 16 may be operated or managed by a Mobile Network Operator (or MNO), a Mobile Virtual Network Operator (or MVNO), a banking Operator, a wire communication network operator, a service Operator (or administrator) or on behalf of a service Operator, as a service provider.

The server 16 comprises several I/O interfaces (not represented) for communicating with external devices, such as two user devices 12 and 14, for each concerned user 11, and one or several (micro)processors (not represented), as data processing means, which are internally linked together.

The server 16 comprises (and/or is connected to) one or several memories 162, as a server memory.

The server memory 162 stores preferably, besides an OS, an invention (user) authentication application accessible from the server 16 processor.

The server memory 162 stores a database.

The database includes a set of user accounts.

Each user account includes one or several user identifiers, such as a user name, associated with one or several first user device identifiers, and data relating to one or several first reference images to be received from or through a concerned identified first user device.

Additionally, each user account includes, in association with the identified user, a rule of relation of an image(s) to be visually selected from a set of one or several images, as a second image set, to be (down)loaded from (or through) the server 16 to a second user device, once the second user device has launched a login (or connection) to the server 16, and an image(s) to be selected from a set of one or several images, as a first image set, to be presented or displayed via a registered first user device.

Such an image relation rule is presented to the user 11 by or through the second user device, or is shared, as a secret, e.g. through a mail or the like, with the user 11.

The server 16 may be configured to generate the image relation rule to be known by the server 16 and the concerned (identified) user 11.

The image(s) to be visually selected from the second image set is referred as a second reference image(s).

The server 16 is configured to generate on-the-fly, i.e. when a second user device launches a login (or connection) session with the server 16, one or several second reference images that do(es) not match with any of the registered first reference image(s).

Alternately or additionally, instead of generating one or several second reference images that do not match with any of the first reference image(s), the server 16 is arranged to retrieve, from a memory included within or connected (or coupled) to the server 16, one or several second reference images that do(es) not match with any of the registered first reference image(s).

The image relation rule may be an identity of the second reference image(s) and the first reference image(s), as the image(s) to be selected by the user 11 from the first image set, or a particular association between the second and the first reference image(s).

The particular association between the second and the first reference image(s) may include the first reference image(s) is(are) distinct from and complementary to the second reference image(s), so as to form, when the first reference image(s) and the second reference image(s) is(are) put together, a corresponding complete predetermined figure. For example, a right part of a heart, as the second reference image, and a left part of the heart, as the associated first reference image, the left and right parts of the heart form when put together a corresponding complete heart.

Alternately, the particular association between the second and the first reference image(s) may include the first reference image(s) is(are) distinct from and complementary to the second reference image(s), so as to form, when the first and the second reference image(s) are associated with each other, a corresponding predetermined family. For example, a first animal, as the second reference image, and a second animal, as the associated first reference image, the first animal and the second animal form when associated a corresponding animal family.

Such a given image relation rule association list is not exhaustive. Other image relation rule may be given while having one or several points or particularities in common.

The server 16 may be adapted to send or receive the image relation rule to or from a registered first user device respectively. The registered first user device receiving or issuing the image relation rule may be either the one used for authenticating the user during a registration or a first user device binding process or after the registration or first user device binding process, or a different first user device.

The server 16 is arranged to receive, through a channel 15, from or through the PC 14, as a client, a user ID(s), so as to identify the concerned (registered) user 11 during a thus launched login (or connection) session.

The server 16 is adapted to send, through the channel 15, to the PC 14 one or several images, as a second image set, to be presented or displayed by or through the PC 14. The second image set includes one or several second reference images that are registered at the server 16 side according to the image relation rule.

The second image set, as a challenge generated for a user authentication session, may be distinct from a subsequent second image set for the same user. In such a case, the second image set is valid only for a given session.

The server 16 is preferably adapted to send, through the channel 15, to the PC 14, as a challenge, a user request to select, through a (registered) first user device, by the user 11, one or several images, as a first image set, to be presented or displayed by or through the first user device.

According to an essential invention feature, the server 16 is further arranged to receive, through an out-of-band channel 13, as a challenge or user request response, one or several identifiers relating to a first user device along with data relating to one or several selected first images.

Such a user request response reception allows continuing, for the identified user, the login (or connection) session launched previously by the second user device.

The use of the out-of-band channel 13 prevents a MiB from intercepting both the challenge and the challenge response data and data mining for the image relation rule, as the secret shared between the user 11 and the server 16.

Prior to such a user request response reception from the phone 12, the server 16 may generate security data relating to the first reference image(s), such as one or several cryptographic keys, by using a corresponding generation algorithm(s) that may have been shared with the concerned first user device. The server 16 stores (or lets store) the possibly generated security data relating to the first reference image(s).

The server 16 may use a decryption key Ke, as a session key, to decrypt an encrypted user request response received from or through the concerned first user device. The server 16 may use a signature verification key Km (or a corresponding public key), as another session key, to verify a signature relating to the user request response that is received from or through the concerned first user device.

The server 16 uses the security data relating to the first reference image(s), so as to receive securely the user request response from the concerned first user device.

The server 16 is adapted to verify, for the identified user, whether the data relating to the selected first image(s) does or does not match the data relating to the first reference image(s) according to the image relation rule.

The server 16 is configured to succeed in authenticating the user 11 if the data relating to the selected first image(s) matches the data relating to the first reference image(s) according to the image relation rule.

The server 16 is configured to fail to authenticate the user 11 if the data relating to the selected first image(s) does not match the data relating to the first reference image(s) according to the image relation rule.

FIG. 2 depicts an example of a message flow 20 that involves the user 11, the phone 12, the PC 14 and the server 16, so that the server 16 authenticates the user 11 based on an image relation rule (namely a rule between a first image to be selected, by the user 11 of the phone 12, among a first image set displayed through the phone 12 and a second image to be visually selected, by the user 11 of the PC 14, among a second image set displayed through the PC 14).

It is assumed that the image relation rule is known to the user 11.

It is further assumed that the server 16 has previously registered (not represented) the user 11 ID in association with the phone 12 number, as a phone ID, a first reference image identifier (a first image hash or the like), as data relating to a first reference image to be received from the phone 12, and the image relation rule.

The first reference image is e.g. a picture of a particular star singer. The user 11 appreciates particularly the considered star singer. The associated second reference image is e.g. a picture of an anonym singer, according to the image relation rule which is related to the star singer of whom the user 11 is fond of, as the considered art.

The phone 12 thus constitutes a reference first user (communication) device to be locally present within the user environment including the PC 14, as another user device, so as to authenticate the user 11.

It is further assumed that the phone 12 accesses the phone 12 number, one or several images, as a first image set, to be displayed by the phone 12 and the first reference image identifier, as data relating to the first reference image, so as to be successfully authenticated.

The user 11 launches 22 an execution of a client supported by the PC 14 and enters a user ID, so that the user 11 logs in firstly to the server 16.

Alternatively, instead of the user 11, the client is automatically launched while entering automatically a user ID (i.e. without any involvement of the user 11).

The PC 14, and more exactly the client, connects to a login portal of the server 16. To do such a connection, the PC 14 transmits to the server 16, through a client channel using e.g., an HTTP type protocol, as a first channel, one or several messages 24 that include the user ID and implicitly or explicitly a request to get an image set, as a second image set.

The server 16 identifies 26 the user 11 based on the user ID.

The server 16 may generate at least partly or access (not represented) a second image set that includes one or several images to be displayed by the PC 14.

The second image set includes a second reference image that satisfies the image relation rule with the first reference image to be received by the server 16 from the phone 12.

The server 16 gets (not represented) the second image set.

The server 16 sends to the PC 14 one or several messages 28 including the second image set to be displayed by the PC 14 and implicitly or explicitly a user request to select, through the phone 12, by the user 11, one image comprised within a first image set to be displayed by the phone 12.

The PC 14 displays 210 either sequentially or all of the images at once of the second image set. The second image set includes the second reference image and possibly one or several images which are not associated, according to the image relation rule, with the first reference image.

The PC 14 may display the user request, such as "Please select one image of the first image set using your image relation rule", to select, through the phone 12, by the user 11, one image among the image(s) to be displayed by the phone 12 and comprised in the first image set.

The user 11 sees the PC display screen 142 and the thus displayed second image set.

The user 11 selects (not represented) visually the image (i.e. without selecting the concerned image by e.g., clicking on a corresponding displayed image on the PC display screen 142) which she or he knows to be, according to the image relation rule, the second reference image that matches with, i.e. corresponds or coincides with, the first reference image.

The user 11 launches 212 an execution of the invention application supported by the phone 12.

The phone 12 gets (not represented) the first image set that is locally registered.

The phone 12 displays 214 either sequentially or all of the images at once of the second image set. The second image set includes the second reference image and possibly one or several images which are not associated, according to the image relation rule, with the first reference image.

The user 11 selects 216 an image by e.g., clicking on a corresponding displayed image on the phone display screen 122, as the selected image.

The phone 12 gets 218 data relating to the selected image that shall be the first reference image identifier, as the data relating to the first reference image that is registered at the server 16 side, to authenticate successfully the user 11.

Optionally, the phone 12 generates 220 (detailed information of an example generation algorithm is given infra) an encryption key Ke and/or a signature key Km, as one or two cryptographic keys, as security data relating to the selected first image.

The phone 12 may use (not represented) the stored (previously generated by the phone 12) security data relating to the selected first image, so that the phone 12 sends securely the user request response to the server 16. The phone 12 thus encrypts, by using the Ke, the first image identifier, as the data relating to the selected first image, and/or signs, by using the Km, the first image identifier, as the data relating to the selected first image.

The phone 12 sends, through e.g., a Short Message Service (or SMS), Multimedia Messaging Service (or MMS), Transmission Control Protocol/Internet Protocol (or TCP/IP), or HTTP type channel, as an out-of band channel, one or several messages 222 that include the user ID and the first image identifier, as the data relating to the selected first image, that may be previously encrypted and/or signed.

The server 16 identifies 224, based on the user ID that is received in plain text, the concerned user 11 and her or his account.

Optionally, the server 16 generates 226 an encryption key Ke and/or a signature key Km, as one or two cryptographic keys, as security data relating to the first reference image. For example, the Ke and/or the Km is(are) generated identically and separately at the phone 12 and server 16 sides as follows:

Derived Key=PBKDF2 (PRF, SelectedImageData, UserID, IterationCount, KeyLength) in which:
  PBKDF2 is the Password-Based Key Derivation Function 2, as described in Public Key Cryptography Standards (or PKCS) #5 and Request For Comments (or RFC) 2898;
  PRF is a Pseudo-Random Function of two parameters, a key and a message. For example, PRF is Hash Message Authentication Code (or HMAC)—Secure Hash Algorithm 1 (or SHA) 1;
  SelectedImageData acts as a master password from which a key is derived. The master password is entered or submitted by the user 11 in the form of a selected image(s). For a registration flow, it is a sequence of e.g. 4 images selected from a set of e.g. 10 images (in the right order). For an authentication flow, it is the single image selected from e.g. the 6 available on the phone 12. In both cases, the server 16 is able to perform the same image "selection" since the server 16 knows which image(s) the user 11 should have selected. Each image is associated with data, in which the data length is configurable. For example, the data length is 32 bytes (i.e. 256 bits) (which is far more than data length of a character in a typical alpha-numeric Personal Identification Number (or PIN) a data length of which is 1 byte). Such an image data length increases the entropy of the possible derived keys;
  UserID may act as the salt;
  IterationCount is the number of desired iterations; and
  KeyLength is the length of the derived key. The key length may be set to twice the session key length. The output key material may then be divided into two keys: Ke and Km MAC (Message Authentication Code). For example, when the derived key is split, the KeyLength is 512 bits when using the AES 256 symmetric encryption algorithm.

The server 16 may use (not represented) the previously generated (by the server 16) security data relating to the first reference image. The server 16 thus decrypts, by using the Ke (or a corresponding key), the first reference image identifier, as the data relating to the first reference image, and/or verifies, by using the Km (or a corresponding key), the signed first image identifier, as the data relating to the selected first image.

The server 16 verifies 228 (after a possible received data decryption and/or a possible verification of the received data signature) whether the first image identifier, as the data relating to the selected first image, does or does not match the first reference image identifier, as the data relating to the first reference image, according to the image relation rule.

In the affirmative, i.e. if the data relating to the selected first image matches the data relating to the first reference image, according to the image relation rule, the server 16 succeeds in authenticating the user 11 and grants user access to a service(s) managed by or through the server 16.

In the negative, if the data relating to the selected first image does not match the data relating to the first reference image, according to the image relation rule, the server 16 fails to authenticate the user 11 and denies user access to the service(s) managed by or through the server 16.

The server 16 generates 230 a corresponding authentication result, such as user authentication success or user authentication failure.

The server 16 sends 232 preferably to the PC 14, through the original channel, a message 232 that includes a request to present or display the authentication result. Then, the PC 14 presents or displays (or lets display) the authentication result (not represented), such as "User authentication failure" or "User authentication success".

Additionally or alternately and still optionally, the server 16 sends to the phone 12, through the out-of band channel, a message (not represented) that includes a request to present or display the authentication result. Then, the phone 12 presents or displays (or lets display) the authentication result (not represented), such as "User authentication failure" or "User authentication success".

The invention authentication solution is visual, simple, intuitive and practical for the user.

The invention authentication solution allows improving the spam prevention (e.g. in the context of GSMA Mobile connect) since the first user device initiates a sending of the user request response to the server. The invention authentication solution also provides an alternative flow from a general out-of-band flow. Instead of the server 16 sending a push type message to the phone 12, according to the invention authentication flow, the phone 12 initiates preferably a connection and sends a message 222, such as an SMS, to the server 16.

The invention authentication solution may offer a strong cryptographically secure 2FA for online access to the server.

Only the user 11 who uses the phone 12 that is previously registered at the server 16 side and present at the user 11 location in which the PC 14 is also present and who knows the image relation rule is able to be successfully authenticated to the server 16.

The invention solution allows carrying out a secure user authentication based on a local presence of the registered first user device that allows sending, through an out-of-band channel, the user request response which the user 11 infers from her or his knowledge of the image relation rule.

The embodiment that has just been described is not intended to limit the scope of the concerned invention. Other embodiments may be given. As another embodiment, instead of using a single first reference image, two or more first reference images are used. As another embodiment, instead of using a Long Range RF technology for the out-of-band channel, the first user device may communicate through any Short Range RF technology(ies), like e.g., a Wi-Fi, Bluetooth, a Near Field Communication or a Bluetooth Low Energy type technology(ies).

The invention claimed is:

1. A method for authenticating a user, wherein, a server accessing at least one user identifier associated with at least one identifier relating to a first user device and data relating to at least one image to be received, from the first user device via a first communication channel, as a first reference image, the first user device accessing the at least one identifier relating to the first user device and data relating to a plurality of first images, as a first image set, to be displayed, by or through the first user device, the method comprising:

connecting, from a second user device, to the server, via a second communication channel;

sending, from the server to the second user device, (i) a plurality of images, as a second image set, (ii) an image relation rule, and (iii) a user request;

displaying, by the second user device, (i) the second image set, from which the user visually selects at least one second image from the plurality of images, (ii) the image relation rule, which defines an association between the at least one second image and the reference first image, and (iii) the user request, which prompts the user to launch an authentication application installed on the second user device;

launching, by the first user device, the authentication application;

displaying, by the first user device, via the authentication application, the first image set including the plurality of first images;

selecting, by the user of the first user device, from the plurality of first images within the first image set displayed by the first user device, at least one displayed first image, as at least one selected first image, wherein the at least one selected first image is visually different from the at least one second image that was visually selected from the second image set displayed on the second user device, but is related to the at least one second image in a manner defined by the image relation rule known to the user and the server;

sending, from the first user device to the server, via the first communication channel, as a user request response, the at least one identifier relating to the first user device accompanied with data relating to the at least one selected first image;

identifying, by the server, based on the at least one identifier relating to the first user device, the user;

verifying, by the server, for the identified user, whether the data relating to the at least one selected first image does or does not match the data relating to the first reference image; and succeeding, by the server, in authenticating the user only if the data relating to the at least one selected first image matches the data relating to the first reference image.

2. Method according to claim 1, wherein, the first user device further accessing security data relating to the at least one selected first image, the server further accessing security data relating to the first reference image, the first user device uses the security data relating to the at least one selected first image and the server uses the security data relating to the first reference image, so that the first user device sends securely the user request response to the server.

3. Method according to claim 2, wherein the server generates the security data relating to the first reference image.

4. Method according to claim 1, wherein, the first user device further accessing, in association with the at least one user identifier, at least one secret shared with the server and data relating to the at least one selected first image, to generate at least one session key, the first user device uses, prior to a sending to the server of the user request response, the at least one session key to encrypt in part or sign the user request response and, the server further accessing, in association with the at least one user identifier, the shared secret and data relating to the first reference image, to generate the at least one session key, the server uses, after a user request response reception, the at least one session key or at least one corresponding session key to decrypt in part the user request response or verify a received signature relating to the user request response.

5. Method according to claim 4, wherein the at least one session key includes a first key to be used by the first user device to encrypt the user request response and a second key to be used by the first user device to sign the user request response.

6. Method according to claim 1, wherein, according to a first image relation rule known to the user and the server, the at least one selected first image is distinct from and complementary to the at least one second image visually selected within the displayed second image set, so as to form, when the at least one selected first image and the at least one selected second image are put together, a complete predetermined image, which is defined by the image relation rule.

7. Method according to claim 1, wherein the association between the at least one selected first image and the at least one second image visually selected within the displayed second image set includes one element of a group including:
   the at least one selected first image is distinct from and complementary to the at least one second image visually selected within the displayed second image set, so as to form, when the at least one selected first image and the at least one selected second image are put together, a corresponding complete predetermined image; and
   the at least one selected first image is distinct from and complementary to the at least one second image visually selected within the displayed second image set, so as to form, when the at least one selected first image and the at least one selected second image are associated with each other, a corresponding predetermined family.

8. A server for authenticating a user, the server comprising:
   a processor;
   means for accessing at least one user identifier associated with at least one identifier relating to a first user device and data relating to at least one image to be received, from the first user device via a first communication channel, as a first reference image, the server processor is configured to:
      be connected from a second user device, via a second communication channel;
      send, to the second user device, (i) a plurality of images, as a second image set, (ii) an image relation rule, which defines an association between at least one second image from the plurality of images and the reference first image, and (iii) a user request, which prompts the user to launch an authentication application installed on the second user device;
      receive, from the first user device, via the first communication channel, as a user request response, at least one first user device identifier accompanied with data relating to at least one selected first image that is visually different from the at least one second image from the plurality of images, but is related to the at least one second image in a manner defined by the image relation rule;
      identify, based on the at least one identifier relating to the first user device, the user;
      verify, for the identified user, whether the data relating to the at least one selected first image does or does not match the data relating to the first reference image; and
      succeed in authenticating the user only if the data relating to the at least one selected first image matches the data relating to the first reference image.

9. A system for authenticating a user, the system comprising:
   a server, the server including a processor,
   a first user device, the first user device including a processor, and
   at least a second user device, wherein
      the server comprises means for accessing at least one user identifier associated with at least one identifier relating to the first user device and data relating to at least one image to be received, from the first user device via a first communication channel, as a first reference image,
      the first user device comprises means for accessing the at least one identifier relating to the first user device and data relating to a plurality of first images, as a first image set, to be displayed, by the first user device;
      the second user device is configured to connect to the server via a second communication channel;
      the server processor is configured to send, to the second user device, (i) a plurality of images, as a second image set, (ii) an image relation rule, and (iii) a user request;
      the second user device is configured to display (i) the second image set, from which the user visually selects at least one second image from the plurality of images, (ii) the image relation rule, which defines an association between the at least one second image and the reference first image, and (iii) the user request, which prompts the user to launch an authentication application installed on the second user device;
      the first user device processor is configured to:
         launch the authentication application;
         display, via the authentication application, the first image set including the plurality of first images;
         enable selection, by the user of the first user device, at least one displayed first image, as at least one selected first image, from the plurality of first images within the first image set displayed by the first user device, wherein the at least one selected first image is visually different from the at least one second image that was visually selected from the second image set displayed on the second user device, but is related to the at least one second image in a manner defined by the image relation rule known to the user and the server;
         send to the server, via the first communication channel, as a user request response, the at least one first user device identifier accompanied with data relating to the at least one selected first image;
      the server processor is configured to:
         identify, based on the at least one identifier relating to the first user device, the user;
         verify, for the identified user, whether the data relating to the at least one selected first image does or does not match the data relating to the first reference image; and
         succeed in authenticating the user only if the data relating to the at least one selected first image matches the data relating to the first reference image.

* * * * *